United States Patent [19]
Gerson et al.

[11] Patent Number: 5,721,826
[45] Date of Patent: Feb. 24, 1998

[54] REPROGRAPHIC DATA TRANSFER SYSTEM

[75] Inventors: Randy Martin Gerson, San Diego; Alan Jay Handler, Laguna Niguel, both of Calif.

[73] Assignee: Automated Resource Management, Irvine, Calif.

[21] Appl. No.: 642,447

[22] Filed: May 3, 1996

[51] Int. Cl.⁶ .................................................. G06F 17/00
[52] U.S. Cl. ........................................................ 395/200.43
[58] Field of Search .......................... 395/200.43, 200.45, 395/339, 347, 352, 226, 239; 348/10

[56]     References Cited

U.S. PATENT DOCUMENTS

| | | | |
|---|---|---|---|
| 5,051,914 | 9/1991 | Sansone et al. | 395/236 |
| 5,383,129 | 1/1995 | Farrell | 395/236 |
| 5,428,606 | 6/1995 | Moskowitz | 348/10 |
| 5,539,735 | 7/1996 | Moskowitz | 348/10 |
| 5,634,012 | 5/1997 | Stefik et al. | 395/239 |

*Primary Examiner*—Ellis B. Ramirez
*Attorney, Agent, or Firm*—Duft, Graziano & Forest, P.C.

[57]     ABSTRACT

A comprehensive order transaction and file transfer protocol system for the reprographic services industry. A sender application at the user site compiles order information and document data files into a single transfer file and sends the transfer file to the receiver application at the provider site. When the transfer file is sent, the sender application prints a confirmation document for the user confirming that the order has been sent. When the order has been received and checked for errors by the receiver application, the receiver application sends a transfer confirmation document to the user confirming the successful receipt of the order data file and the document data files. The receiver application notifies the provider personnel, such as through activation of a personal pager, that a new order has been received and should be processed.

28 Claims, 3 Drawing Sheets

REPROGRAPHIC DATA TRANSFER SYSTEM

FIELD OF THE INVENTION

The invention relates to the field of electronic transfer of reprographic data. In particular, the invention relates to a system of electronically transferring reprographic data in a way that generates a complete transaction record for the user of the reprographic services and generates a work-awareness signal for the reprographic services provider. The work-awareness signal automatically notifies the provider of the receipt of a new order.

STATEMENT OF THE PROBLEM

There are a variety of processes that are utilized to produce copies from a master image. All of these processes, whether xerographic, offset, lithographic or otherwise, can be categorized under the general term of reprographic processes. No matter what particular reprographic process one considers, the basic process is the same. A master copy provides data which is input to a reprographic process where multiple copies of the master copy are produced. This is, of course, a gross over-simplification but one that is useful for describing the advantages of present invention. To further define the field of the present invention it is helpful to understand that, in the case of the present invention, the master copy is physically distant from the machinery and equipment used in the reprographic process of interest. In addition, the master copy is in the form of digital information stored in a format recognizable by computers.

The reprographic industry, sometimes commonly referred to as the printing industry, has been, like most industries, transformed over the past several decades by advances in technology. Most reprographic processes are in some way, if not in their totality, controlled or influenced by computers. At one time customers of reprographic service providers would bring their master copy, or a rough draft or concept of the master copy to the reprographic service provider. The reprographic service provider would transform the master copy from the user into the format necessary for the particular reprographic process.

Today the prevalence of desktop publishing is such that the typical customer in need of reprographic services has already developed their master copy, be it a brochure, magazine, manual or any other document, using a desktop publishing program. What the user then brings to the provider is a data file which, in some standard computer format, contains the document to be printed or reproduced. A resulting change in the reprographic industry is that a large share of the industry's business is focussed on receiving a finished master copy from the user in the form of digital data, applying that data to the requested reprographic processes, and doing so by providing a quality product, for the lowest price, and with the quickest turn-around. This means that in a broad array of the most common reprographic services, reprographic service providers (hereinafter "providers") must differentiate themselves from their competitors in terms of service. In this case, service means primarily quality, speed and price.

Since the master copy delivered to a provider is now commonly in the form of a computer data file, transferring that file from the user to the provider is a critical link between the user and provider in the reprographic industry. Absent any requirements of timeliness, delivering a computer floppy disk or cassette to a provider will satisfy the requirement of "transferring" the data from the user to the provider. However, most users demand, and most providers attempt to supply, service turn-around measured in days and hours, time-frames which do not allow for the mailing of a floppy disk.

There are various products currently available for establishing reliable data file transfer between providers and users. Unfortunately, none of the prior art systems offer a comprehensive system which takes into account the way in which the reprographic industry operates and interacts with its customers. The focus has so far been on providing a technical solution to the not insignificant problems posed by the transfer, without error, of large data files quickly and over great distances.

Typically, the prior art file transfer systems require the user to fill out an order form specifying the reprographic services that it is requesting from the provider. The user then sends the order form, electronically or by fax, to the provider. The user then retrieves the data file containing the document in electronic form. A file compression routine is then run by the user to compress the file into the necessary format for the individual system. The user then sends the compressed file to the provider via a modem/telephone link. The provider receives the order form which it combines with the separately transmitted order form and proceeds to perform the requested work.

There are several disadvantages to these systems. One disadvantage is that the user must perform multiple tasks in order to place a single order with the provider. Another disadvantage is that the user is required to perform certain technical tasks, such as running the file compression routines, that may be outside the area of expertise of the user.

Still another disadvantage is the lack of a hard-copy record of the order and file transfer. Despite the widespread use of computer technology, the printing industry, like many others, still depends on a paper record for its accounting requirements and accountability of work performed and requested. Prior art systems do not automatically provide the necessary paper record or conform to the methods of business currently practiced by the reprographic industry. For example, when an order, and the related data file, are sent from the user to the provider, the user requires a paper record of what was ordered and when it was ordered. Often such a record is even required before the order is placed so that a purchase order number can be approved and obtained by the user. The user also requires a confirmation from the provider that the order has been received and is being processed. If some problem occurs in the transfer of the data file, the provider may never receive the order while the user may assume that the order is already being processed by the provider. In a business where order turnaround is typically measured in hours, delays such as this are unacceptable.

A further characteristic of the reprographic services industry is that an order is processed only when someone with the appropriate responsibility at the provider site initiates the necessary work. There are many reasons for this. One reason is that a provider is constantly faced with numerous orders having competing and varied priority demands. Each new order must be analyzed and integrated with the prior orders in terms of time demands and work load on various equipment. Another reason for the need for human intervention in the order processing system is that much of today's industrial reprographic equipment is not designed to directly accept computerized data in standardized formats. Often someone at the provider will need to take the user provided data file, convert the data file to the appropriate format, and load the converted data file on the proper piece of equipment. There also is often a need to load, or make available to appropriate equipment, certain printing stock or supplies in order to fill the user's order. For all these reasons, and others, someone such as a machine operator or a scheduler must be made aware of the arrival of an order before the order can be processed. At a time when orders arrived by mail or by delivery or in person, this was not an issue. However, orders can today be received over a phone line by a computer and no one at the provider site even knows of the order until someone at the provider site checks the computer that has been configured to receive orders. This causes delays in the processing of orders. As noted above, reprographic service providers have little on which to differentiate their services from those of their competitors. Thus delays in processing new orders can quite literally cost providers their customers.

There exists a need for a comprehensive reprographic services transaction system that provides a simple and flexible interface between reprographic service providers and users of their services. There exists a further need for such a system that provides confirmations of the order transaction, appropriate for the printing industry, such that the user is provided a complete paper record of the transaction and the provider is made aware of the receipt of a new order.

STATEMENT OF THE SOLUTION

The present invention solves the above problems and others thereby advancing the state of the art in systems providing communications between reprographic service providers and their customers. The system of the present invention provides, for the first time, a comprehensive order transaction system for the reprographic services industry which actually integrates seamlessly with the business of the user on one end and the business of the provider on the other end. The inventive system is designed to conform with the business practices of the customer, users of the reprographic services, thereby easing the burden on the user when placing an order with the provider. Likewise, at the provider's end of the order transaction, the system is designed to conform to the business practices of the reprographic services provider. The end result is that, when employed by a reprographic services provider, the present invention allows the provider to deliver more efficient, faster, and improved services to its customers.

The system of the present invention allows a user to fill out an order form on their computer thereby indicating the reprographic services which it requires. The remaining technical steps necessary to transfer the order to the provider are invisible to the user. The user, as subsequent events occur, is provided with a complete paper transaction file for its records. On the receiving end of the order, the appropriate provider personnel are notified when the order has been received, decompressed, and checked for errors. In this way, the user enjoys the simplicity of placing its order electronically while having a complete hard-copy transaction file generated automatically. The provider is notified by the system when the order has been successfully received and also knows that the user has already been notified of the successful receipt of the order. Processing of the order can then proceed with the provider having use of the full amount of time available between when the user placed the order and when the user wants to receive delivery of the finished order.

Operation of the system requires that software implementing the present invention be loaded on a computer at the provider site. Each user must also load corresponding software on a computer at the user site. The system of the present invention begins with the user calling up an order screen on their computer. The order form screen prompts the user to enter data which includes the individual placing the order, what reprographic services are requested, the users job name and job number, the due date, and the purchase order number. The user also inputs a file name and pathway description so that the system will know from where to retrieve the document data file(s) to be processed by the provider. The user might input this information by typing it or by selecting the proper file(s) using the computer mouse to manipulate pull-down menus.

When the order form is complete and the user wishes to place the order with the provider, the user depresses a software generated send button. The system of the present invention then formats the administrative data from the order form, retrieves the document data file(s) identified by the user, and compresses both the order form information and the document data file(s) into a single transfer file to be transmitted to the provider. The system then establishes a communications link between the users computer and the provider's computer after which the transfer file is transmitted from the user's site to the provider's site.

Once the transfer file has been sent from the user to the provider, a paper confirmation of the order is printed from the users computer at the users site. This gives the user a paper confirmation that the order has been placed with the provider. The order confirmation includes all the information which the user deems necessary for its records regarding the particular order.

When received by the providers computer, the system recreates the separate files that were used to create the transfer file, namely the order information file and the document data file(s). At the same time, the system checks for errors in both the order information file and the document data file(s) to ensure that all data has been accurately transmitted from the user to the provider. If the data transfer was successful, the system causes the providers computer to send a confirmation of the successful order transfer to the user's fax machine. The successful order transfer confirmation includes all information deemed necessary by the user regarding the particular order. This gives the user a paper confirmation that the data sent by the user has been successfully received by the provider thus completing the user's order transaction file for this particular order.

The system causes the provider's computer to perform one additional step in the event of a successful receipt of an order. The providers computer is caused to notify the appropriate person, a machine operator or scheduler for example, that a new order has been received. This work-awareness notification can occur in any number of ways but one that is particularly well suited to the operation of a printing business is to activate a personal pager. In this way a machine operator or scheduler can be on the shop floor, as is typically the case, and be automatically alerted the moment the inventive system determines that a new order has been successfully received. In this way, no time is lost between the time of receipt of a new order and the integration of the new order into the production plans of the provider. In addition, as described above, the provider's personnel do not need to take time from their production tasks to confirm receipt of the order with the user as the system has already delivered a written confirmation to the user's site.

The system of the present invention provides, for the first time, a comprehensive order transaction system for the reprographic industry which actually integrates seamlessly with the business of the user on one end and the business of the provider on the other end.

Other salient features, objects, and advantages are apparent to those skilled in the art upon a reading of the discussion below in combination with the accompanying drawings.

DETAILED DESCRIPTION

Figure 1:
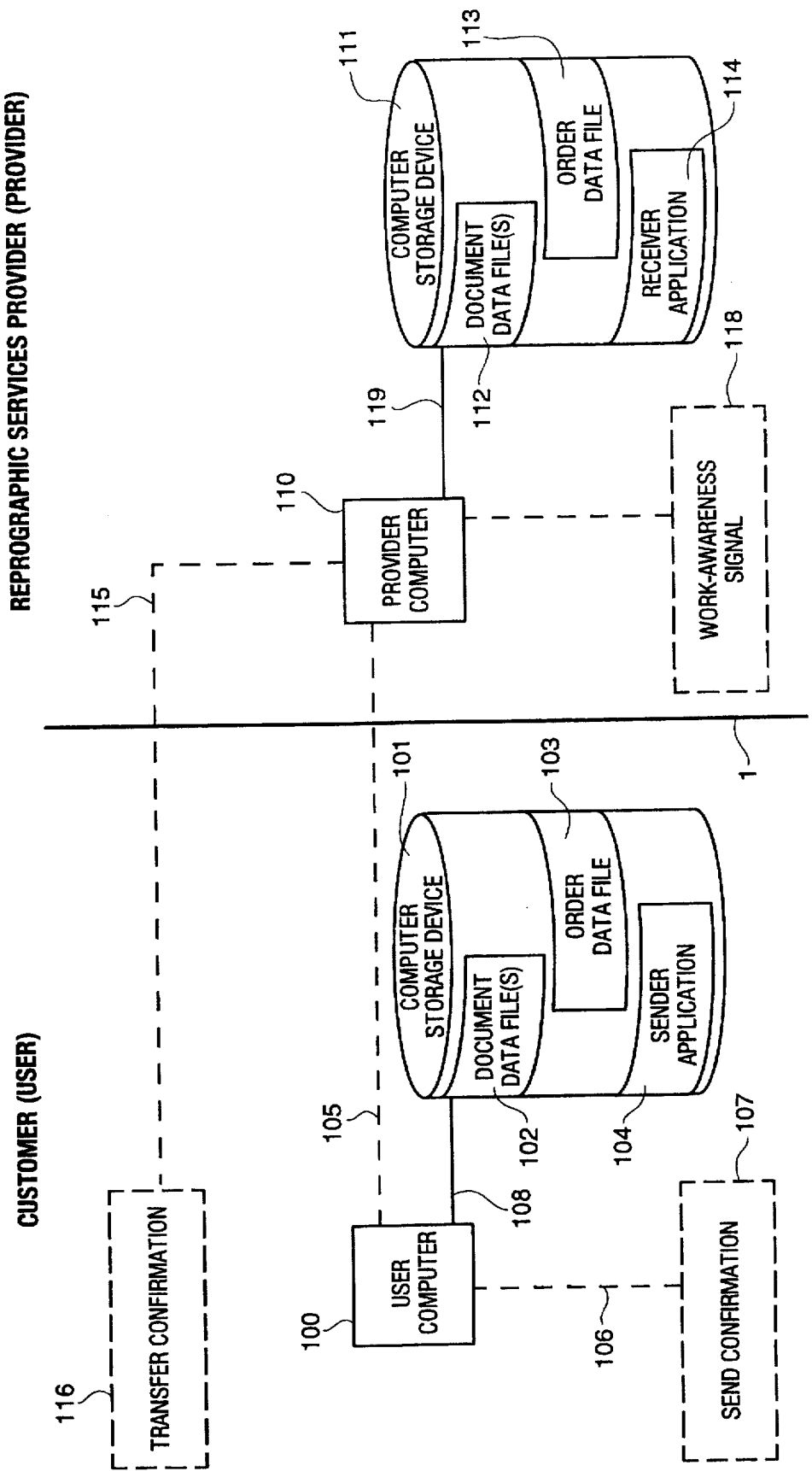
FIG. 1 depicts a block diagram view of the overall system of the present invention.

Description Of Overall System (FIG. 1)

FIG. 1 depicts in block diagram form the primary components and data flow of a reprographic data transfer system 10 of the present invention. Everything shown in FIG. 1 to the left of solid line 1 is at, or occurs at, the user site while everything shown to the right of dashed line 1 is at, or occurs at, the provider site. The solid boxes of FIG. 1 represent devices while the dashed boxes represent confirmation events.

User computer 100 is a standard personal computer connected to at least one computer storage device 101 over path 108. In a preferred embodiment of the present invention, user computer 100 is a personal computer running a Windows or Macintosh operating system. A similar computer is located at the provider site. In a preferred embodiment of the present invention provider computer 110 is a personal computer running a Windows operating system and connected to at least one computer storage device 111 over path 119. Those skilled in the art recognize that the present invention could be implemented on computers running other operating systems as well.

The present invention is implemented to operate in standard windows-based formats such that the user simply depresses software implemented buttons on various windows in order to manipulate the functions and features of the present invention. Various industry standard development tools have been used to implement the present invention in this form. These tools include Visual Basic, C, FoxPro, and Access. One skilled in the art will recognize that there is an endless variety of ways in which the present invention can be implemented using such tools. These various implementations may differ the "look and feel" of the interface but still utilize the basic teaching of the present invention. The application implementing the present invention is stored as sender application 104 on storage device 101 and receiver application 114 on storage device 111.

Input of Order Information (FIG. 1)

The overall operation of the present invention is described, with respect to FIG. 1, by following a single order from its initiation at the user site to its fulfillment at the provider site. The operation of the present invention is also described in more detail with respect to the process flow charts of FIGS. 2 and 3.

The order process begins when the user begins sender application 104 by loading sender application 104, in a known way, into the random access memory (RAM) (not shown) of user computer 100. The user then calls up the order form window on their computer monitor (not shown) screen and is presented with an order form to be filled out by typing in the requested information. There are basically three types of information input by the user into the order form. The first category of information input into the order form is that administrative information necessary for conducting a business transaction. This includes the users job name and job number, the due date, the purchase order number, and the facsimile number for transfer confirmation 116, discussed below. The second category of information input by the user to the order form is that information required by the provider in order to perform the necessary work for the user. This information includes the type of reprographic service, the type of stock on which the document is to be printed, the quantity, and any additional features such as stapling or binding of documents. The information input by the user is entirely flexible and the system of the present invention can be configured such that more or less information than just described is input by the user into the order form.

The third category of information input by the user to the order form is a file name and pathway description of document data file(s) 102 which contains the master copy of the document(s) to be sent to the provider. Document data file(s) 102 is stored on computer storage unit 101.

Once the order form is completed, order form data file 103, comprising the three categories of information input by the user at the order form window, is stored on computer storage device 101. Computer storage device 101 is typically the hard drive of user computer 100 but could be any computer data storage device. FIG. 1 depicts order data file 103 and document data file(s) 102 as being stored on the same storage device but those skilled in the art recognize that the data files could be stored on different storage devices. The user can choose to place the order immediately or can store the order and continue to make changes to order data file 101 up until the time the order is placed.

Sending the Order (FIG. 1)

When the user directs sender application 104 to place the order, document data file(s) 102 and order data file 103 are retrieved from their respective locations on computer storage device 101 into the RAM of user computer 100. Document data file(s) 102 and order data file 103 are combined into a single, compressed transfer file (not shown). The methods used to compress the files are known to those skilled in the art and can include freely available routines such as PKZip or, as used in development of the preferred embodiment, customized compression routines developed under license of a compression routine development package such as PKWare. Corresponding routines are part of receiver application 114 and are used to decompress the transfer file at the appropriate time, as discussed below.

Once the transfer file is generated, sender application 104 causes user computer 100 to establish a communications link with provider computer 110. In the preferred embodiment this is accomplished using standard modems (not shown) at both the provider and user sites. The modems are both connected to standard telephone lines 105. Known telecommunications handshake and protocol routines are utilized to establish electronic communication between user computer 100 and provider computer 110. It is obvious to those skilled in the art that telephone line 105 could instead be an ISDN line or an internet or intranet connection or any other means of transferring digital data over a distance.

Send Confirmation (FIG. 1)

The transfer file is then communicated over telephone line 105 to provider's modem which receives the transfer file and inputs the transfer file to provider computer 110. When the transfer file has been sent from user's computer 100, the sender application 104 causes computer 100 to generate a send confirmation document 107 which, in the preferred embodiment, is output over path 106 to a local printer at user's site. Local send confirmation 107 provides the user with a written confirmation of what was ordered and when the order was placed. The system of the present invention is configurable by the user to modify the content and type of send confirmation 107. For example, user may specify that send confirmation 107 should contain the name of the person who issued the purchase order number for the order, a piece of information not normally included on the send confirmation 107. Also, rather than printing send confirmation 107 to a local printer, the system may instruct computer 100 to transmit send confirmation 107 to a remote or a local fax. For example, the order may have been placed from users marketing department but user would like send confirmation 107 to be sent to a fax machine in users accounting department.

Receiving the Order (FIG. 1)

Once the transfer file has been received at provider computer 110, continued operation of system 10 converts to provider computer 110, and receiver application 114. The transfer file is then decompressed into document data file(s) 112 and order data file 113, as described below.

When the transfer file is constructed by sender application 104 on user computer 100, error encoding is implemented as part of the compression routines used to compress the transfer file. As receiver application 114, operating on provider computer 110, decompresses the transfer file, the error encoding is checked to ensure that no errors occurred during the transmission of the transfer file from user computer 100 to provider computer 110. There are a great number of known error encoding and checking techniques. In the preferred embodiment, a hash total, which is representative of the total number of bits in the transfer file, is calculated when the transfer file is compressed. As the transfer file is decompressed, a hash total for the received transfer file is determined and compared to the initial hash total. Any difference between the hash total determined at compression and the hash total determined at receipt indicates that errors occurred during the transmission of the transfer file from user computer 100 to provider computer 110.

Order Receipt Confirmations (FIG. 1)

After receiver application 114 has determined, through the above described error checking, that transmission of the transfer file was successful, document data file(s) 112 and order data file 113 are stored on storage device 111. Provider computer 110 then generates a signal over path 115 to create a transfer confirmation document 116 at user's site. In the preferred embodiment this occurs via standard facsimile transmission over telephone line 115 thereby generating transfer confirmation 116 on user's fax machine. Transfer confirmation 116, along with send confirmation 107, provides user with a complete order transaction file. When placing the order, user can specify the facsimile number to which transfer confirmation 116 should be sent. As noted above with respect to send confirmation 107, the user might direct that transfer confirmation 116 be sent to the accounting department fax machine. It is apparent to those skilled in the art that transfer confirmation 116 could be generated at users site by means other than a fax transmission. If appropriate for users business, any other form of electronic transmission could be employed.

Having notified the user of a successful transfer of the order, receiver application 114 now causes provider computer 110 to provide a signal over path 117 to create work-awareness signal 118. The provider configures their system so that the appropriate work-awareness signal 118 is generated upon receipt of an order. Given that the person needing notification of a new order is rarely someone sitting at a computer, a useful form of work-awareness signal 118 is an activation of a personal pager. The pager is worn by the appropriate personnel, a production manager, for example, and is activated by signal 117 generated by providers computer 110 upon successful receipt of a new order. The production manager now knows to go investigate the nature of the new order so that it can be integrated with the existing production plans.

In a further embodiment of the present invention, a unique work-awareness signal 118 is generated for each user. For example, responsibility for the work of specific users may be assigned to different ones of provider's personnel. When an order data file 113 and document data file(s) 112 are received by provider, receiver application 114 determines which user the files were sent from and then notifies, using a work-awareness signal 118, the appropriate provider personnel with responsibility for processes that user's orders.

Figure 2:
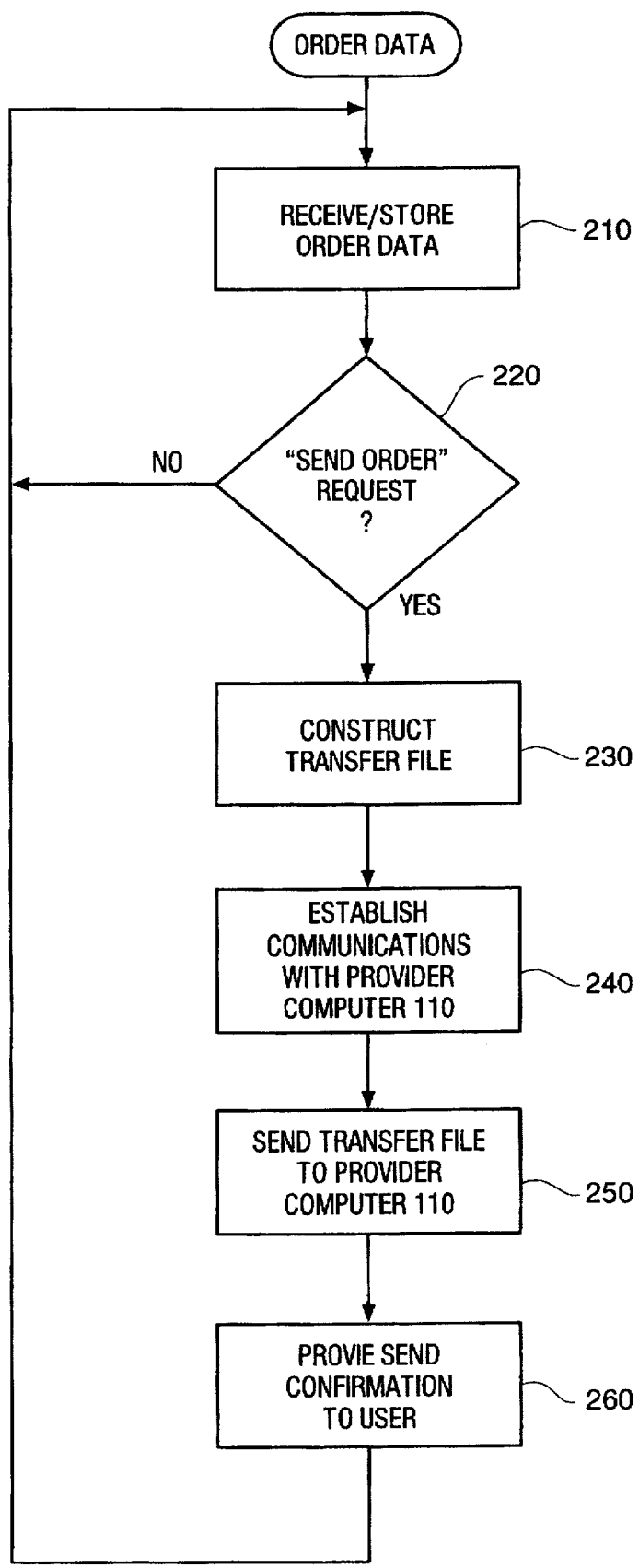
FIG. 2 depicts a flow diagram of the operation of the users side of the system of the present invention.
Figure 3:
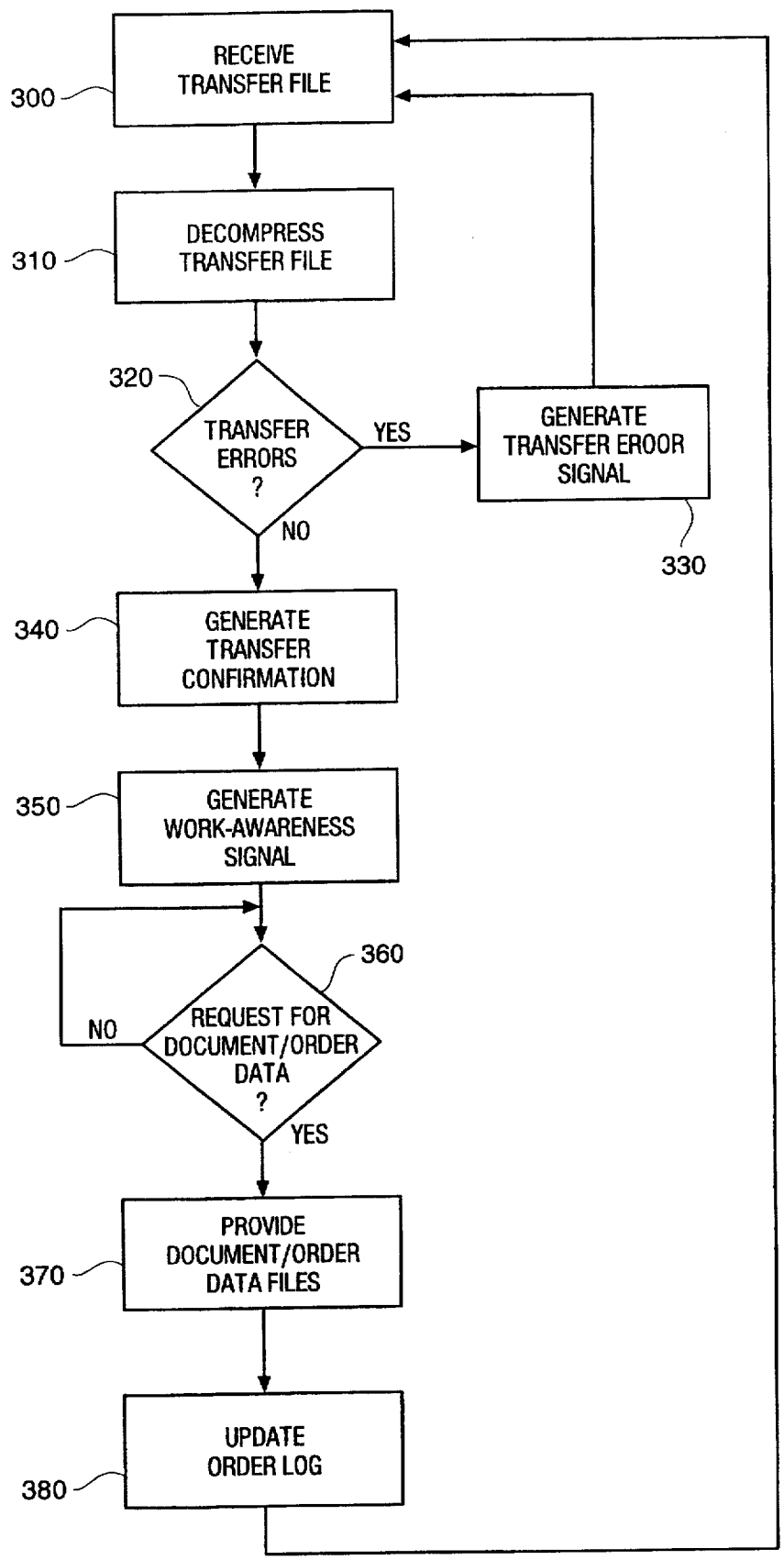
FIG. 3 depicts a flow diagram of the operation of the providers side of the system of the present invention.

Description of System Process Flow (FIGS. 2 and 3)

The operation of system 10 is now described with respect to the process flow charts of FIGS. 2 and 3. With reference to FIG. 2, operation of system 10 begins with the input of data by the user at Step 210. The user inputs data in the format of the order form screen as described above with respect to FIG. 1. During Step 210, sender application 104 receives the order related data and stores the data as order data file 103.

During Step 220, sender application 104 waits for user to choose the "send order" selection. If user has not yet chosen to send the order, system control returns to Step 210. In this fashion, order data file 103 can be edited by the user up until the time the order is sent. If, at Step 220, the user has chosen to send the order, sender application 104 continues to Step 230.

During Step 230, sender application 104 constructs the transfer file. The transfer file is constructed by compressing document data file(s) 102 and order data file 103, along with error correction codes as discussed above, into a single file. Once the transfer file is constructed, sender application 104 continues to Step 240.

During Step 240, sender application 104 causes user computer 100 to establish communications with provider computer 110. In the preferred embodiment this occurs through standard modem/phone line connection as described with respect to FIG. 1.

During Step 250, the transfer file is transmitted from user computer 100 to provider computer 110. The transfer protocols and handshaking protocols utilized are industry standard protocols known to those skilled in the art. After user computer 100 has completed transmitting the transfer file, sender application 104 continues to Step 260.

During Step 260, sender application 104 causes user computer 100 to generate send confirmation 107. After send confirmation 107 has been generated, control of system 10 passes to provider computer 110 in Step 300.

Referring now to FIG. 3, during Step 300, provider computer 110 receives the transfer file over path 105 from user computer 100. Once the transmission of the transfer file is complete, receiver application 114 terminates the communications connection with user computer 100 and continues to Step 310.

During Step 310, receiver application 114 causes provider computer 110 to decompress the transfer file. The resulting files, document data file(s) 112 and order data file 113, are stored in storage device 111.

During Step 320, receiver application 114 compares the initial hash total, calculated when the transfer file was constructed by user computer 100, to the hash total of the received transfer file, calculated when the transfer was decompressed by provider computer 110. If the hash total of the received transfer file differs from the initial hash total then document data file(s) 112 differs from document data file(s) 102 or order data file 113 differs from order data file 103. This means that one, or both, data files have been corrupted in some fashion during the transmission from user computer 100. In this event, receiver application 114 continues to Step 330 where provider computer 110 is caused to generate transfer error signals. The transfer error signal might consist of a facsimile message to the user notifying the user of the need to re-send the order. The transfer error signal might also consist of a warning to the provider to contact the user and investigate any communications compatibility problems. The nature of the error transfer signal is configurable by the user and the provider. After generation of the transfer error signal, control of system 10 returns to Step 300 to wait for transmission of the next order. If no difference is detected between the hash total of the received transfer file and the initial hash order, then receiver application 114 passes from Step 320 to Step 340.

During Step 340, system 10 generates the transfer confirmation 116 described with respect to FIG. 1. As noted above, transfer confirmation 116 is a facsimile transmission over path 115 to users designated fax machine and completes user's transaction file for this order. System operation then proceeds to Step 350.

During Step 350, work awareness signal 118, described with respect to FIG. 1, is generated. As noted above, work awareness signal 118 can be used to activate a personal pager, turn on a red light, or perform any other function which is suitable for the particular provider. After generating work-awareness signal 118, provider application 118 continues to Step 360.

During Step 360, receiver application 114 waits for provider personnel to request order data file 113 and document data file(s) 112. When such a request occurs, operation of receiver application 114 continues to Step 370.

During Step 370, document data file(s) 112 and order data file 113 are provided in whatever format requested by the provider. This could mean that order data file 113 is output to a printer and document data file(s) 112 is copied to a floppy disk. Alteratively, it could mean that document data file(s) 112 is sent over provider's internal computer network to be supplied as input to a Xerox DocuTech machine or other automated equipment. Once the data files have been supplied as requested, operation of receiver application 114 continues to Step 380.

During Step 380, an order log is updated with various administrative data related to the newly received order. This information is configurable by the provider to be consistent with provider's business practices and typically means writing the basic order information to storage device 111. Once this step is complete, receiver application 114 operation returns to Step 300 and awaits receipt of a new order.

A further advantage of the present invention is the advantages in data security which its design provides. Sender application 104 is provided to user by provider on several installation floppy disks. The installation disks include password information that is transmitted from user computer 100 to provider computer 110 when computer 100 attempts to establish a communications link with computer 110. If a computer attempting to establish communications with provider computer 110 is unable to provide the appropriate password information, the computer attempting to connect will be rejected by provider computer 110.

Another aspect of data security is provided by the way in which document data file(s) 102 and order data file 103 are compressed. Even if one were able to intercept transmission of the transfer file, it is not possible to separate and retrieve the individual files 102 and 103 without the corresponding compression routines in receiver application 114. In addition, if user places multiple orders at one time, sender application 104 will compress all of the individual order data files and all of the individual document data files into a single transfer file. This further complicates the effort necessary for an authorized receiver or interceptor of the transfer file to recreate the individual files.

The above described reprographic data transfer system provides, for the first time, a comprehensive order transaction system for the reprographic industry which actually integrates seamlessly with the business of the user on one end and the business of the provider on the other end.

It is to be expressly understood that the claimed invention is not to be limited to the description of the preferred embodiment but encompasses other modifications and alterations within the scope and spirit of the inventive concept.

We claim:

1. In a system for transferring reprographic data between a user at a user site having a need for reprographic services and a provider at a provider site having available reprographic services wherein said reprographic data is transmitted electronically from said user site to said provider site, the method comprising the steps of:

accepting order information at said user site, transmitting said order information and said reprographic data from said user site to said provider site, affirming that said order information and said reprographic data was transmitted from said user site to said provider site, confirming at said provider site that said order information and said reprographic data was received at said provider site, and providing, in response to said confirming step, a notification that said order information and said reprographic data was successfully received at said provider site.

2. The method of claim 1 wherein said step of accepting order information at said user site comprises the steps of:

receiving said order information including addresses for one or more document data files containing said reprographic data; and storing said order information in an order data file.

3. The method of claim 2 wherein said step of receiving said order information comprises the steps of:

accepting said order information from keyboard input by said user.

4. The method of claim 2 wherein said step of receiving said order information comprises the steps of:

accepting said order information from menu selections chosen by said user.

5. The method of claim 2 wherein said transmitting step comprises the steps of:

constructing a transfer file from said order data file and each of said document data files, establishing a communications link between said user site and said provider site, sending said transfer file from said user site to said provider site utilizing said communications link; and receiving said transfer file at said provider site.

6. The method of claim 5 wherein said constructing step comprises the steps of:

retrieving said order data file and each of said document data files, determining a first error code; and compressing said order data file and each of said document data files and said first error code into said transfer file.

7. The method of claim 1 wherein said affirming step comprises the steps of:

generating a send confirmation document, in response to completion of said transmitting step; and outputting said send confirmation document to said user.

8. The method of claim 5 wherein said confirming step comprises the steps of:

decompressing said transfer file to recreate said order data file and each of said document data files and said first error code, determining a second error code, comparing said second error code to said first error code; and generating, in response to said comparing step, a transfer confirmation signal indicative of the integrity of said order data file and each of said document data files.

9. The method of claim 8 wherein said providing step comprises the steps of:

generating a transfer confirmation document, in response to said transfer confirmation signal, at said provider site, wherein said transfer confirmation document declares the integrity of said order data file and each of said document data files; and sending said transfer confirmation document to said user at a destination specified by said user in said order information.

10. The method of claim 9 wherein said sending step comprises:

delivering said transfer confirmation document to a facsimile machine at a telephone number specified by said user in said order information.

11. The method of claim 8 wherein said step of providing a notification comprises the steps of:

developing a work-awareness signal, in response to said transfer confirmation signal, indicative of the integrity of said order data file and each of said document data files; and transmitting said work-awareness signal to a destination specified by provider to alert said provider of the arrival of said document data files.

12. The method of claim 11 wherein said step of transmitting said work-awareness signal comprises:

activating a personal pager at a telephone number specified by provider to alert said provider of the arrival of said document data files.

13. The method of claim 11 wherein said step of transmitting said work-awareness signal comprises:

lighting a light at said provider site to alert said provider of the arrival of said document data files.

14. The method of claim 11 wherein said step of developing a work-awareness signal comprises the steps of:

identifying said user, developing, in response to said transfer confirmation signal and the identity of said user, a work-awareness signal unique to said identified user; and transmitting said work-awareness signal to the personnel of said provider having responsibility for processing said reprographic data from identified user.

15. In a system for transferring reprographic data between a user at a user site having a need for reprographic services and a provider at a provider site having available reprographic services wherein said reprographic data is transmitted electronically from said user site to said provider site, the apparatus comprising:

means for accepting order information at said user site, means for transmitting said order information and said reprographic data from said user site to said provider site, means for affirming that said order information and said reprographic data was transmitted from said user site to said provider site, means for confirming at said provider site that said order information and said reprographic data was received at said provider site, and means for providing, in response to said confirming step, a notification that said order information and said reprographic data was successfully received at said provider site.

16. The apparatus of claim 15 wherein said means for accepting comprises:

means for receiving said order information including addresses for one or more document data files containing said reprographic data; and means for storing said order information in an order data file.

17. The apparatus of claim 16 wherein said means for receiving said order information comprises:

means for accepting said order information from keyboard input by said user.

18. The apparatus of claim 16 wherein said means for receiving comprises:

means for accepting said order information from menu selections chosen by said user.

19. The apparatus of claim 16 wherein said means for transmitting comprises:

means for constructing a transfer file from said order data file and each of said document data files, means for establishing a communications link between said user site and said provider site, means for sending said transfer file from said user site to said provider site utilizing said communications link; and means for receiving said transfer file at said provider site.

20. The apparatus of claim 19 wherein said means for constructing comprises:

means for retrieving said order data file and each of said document data files, means for determining a first error code; and means for compressing said order data file and each of said document data files and said first error code into said transfer file.

21. The apparatus of claim 15 wherein said means for affirming comprises:

means for generating a send confirmation document, in response to completion of said transmitting step; and means for outputting said send confirmation document to said user.

22. The apparatus of claim 19 wherein said means for confirming comprises:

means for decompressing said transfer file to recreate said order data file and each of said document data files and said first error code, means for determining a second error code, means for comparing said second error code to said first error code; and means for generating, in response to said comparing step, a transfer confirmation signal indicative of the integrity of said order data file and each of said document data files.

23. The apparatus of claim 22 wherein said means for providing comprises:

means for generating a transfer confirmation document, in response to said transfer confirmation signal, at said provider site, wherein said transfer confirmation document declares the integrity of said order data file and each of said document data files; and means for sending said transfer confirmation document to said user at a destination specified by said user in said order information.

24. The apparatus of claim 23 wherein said means for sending comprises:

means for delivering said transfer confirmation document to a facsimile machine at a telephone number specified by said user in said order information.

25. The apparatus of claim 22 wherein said means for providing a notification comprises:

means for developing a work-awareness signal, in response to said transfer confirmation signal, indicative of the integrity of said order data file and each of said document data files; and means for transmitting said work-awareness signal to a destination specified by provider to alert said provider of the arrival of said document data files.

26. The apparatus of claim 25 wherein said means for transmitting said work-awareness signal comprises:

means for activating a personal pager at a telephone number specified by provider to alert said provider of the arrival of said document data files.

27. The apparatus of claim 25 wherein said means for transmitting said work-awareness signal comprises:

means for lighting a light at said provider site to alert said provider of the arrival of said document data files.

28. The apparatus of claim 25 wherein said means for developing a work-awareness signal comprises:

means for identifying said user, means for developing, in response to said transfer confirmation signal and the identity of said user, a work-awareness signal unique to said identified user; and means for transmitting said work-awareness signal to the personnel of said provider having responsibility for processing said reprographic data from identified user.

* * * * *